US010419332B2

United States Patent
Ouedraogo et al.

(10) Patent No.: US 10,419,332 B2
(45) Date of Patent: Sep. 17, 2019

(54) FEEDBACK MANAGEMENT IN A MULTIPATH COMMUNICATION NETWORK

(71) Applicant: CANON KABUSHIKI KAISHA, Tokyo (JP)

(72) Inventors: Naël Ouedraogo, Maure de Bretagne (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 14/933,810

(22) Filed: Nov. 5, 2015

(65) Prior Publication Data

US 2016/0134519 A1 May 12, 2016

(30) Foreign Application Priority Data

Nov. 7, 2014 (GB) .................................. 1419904.6

(51) Int. Cl.
*G06F 15/16* (2006.01)
*H04L 12/707* (2013.01)
*H04L 29/06* (2006.01)
*H04L 12/721* (2013.01)

(52) U.S. Cl.
CPC ............ *H04L 45/24* (2013.01); *H04L 45/124* (2013.01); *H04L 65/608* (2013.01)

(58) Field of Classification Search
USPC ........................................................ 709/227
See application file for complete search history.

(56) References Cited

U.S. PATENT DOCUMENTS

| 6,728,748 B1* | 4/2004 | Mangipudi | ......... H04L 41/5009 |
| | | | 709/226 |
| 7,072,304 B2* | 7/2006 | Ng | .......... H04L 45/00 |
| | | | 370/238 |
| 7,392,039 B2* | 6/2008 | Souissi | ............... H04L 12/5692 |
| | | | 379/67.1 |
| 7,778,242 B1* | 8/2010 | Barany | .................. H04L 12/66 |
| | | | 370/338 |
| 7,782,787 B2* | 8/2010 | Karol | ...................... H04L 43/50 |
| | | | 370/216 |
| 8,170,554 B2* | 5/2012 | Souissi | ............... H04L 12/5692 |
| | | | 455/435.3 |
| 8,243,604 B2* | 8/2012 | Kothari | .................. H04L 45/12 |
| | | | 370/238 |

(Continued)

FOREIGN PATENT DOCUMENTS

WO 2011/131565 A1 10/2011

*Primary Examiner* — Alicia Baturay
(74) *Attorney, Agent, or Firm* — Canon U.S.A., Inc. IP Division

(57) ABSTRACT

A method of managing feedback messages in a multipath communication network, the method comprising selecting at least one communication path out of a set of communication paths between a first communication device and a second communication device in order to transmit at least one feedback message from the first communication device to the second communication device. The selecting is based on a correlation between at least one transmission condition on said at least one communication path and at least one transmission constraint for said at least one feedback message.
Embodiments make it possible to provide optimal transmission of feedback messages in a multipath context.

19 Claims, 10 Drawing Sheets

RTCP packet synchronisation

(56) References Cited

U.S. PATENT DOCUMENTS

| | | | | |
|---|---|---|---|---|
| 8,274,909 B2* | 9/2012 | Harvell | ............... | H04L 47/283 |
| | | | | 370/252 |
| 8,706,914 B2* | 4/2014 | Duchesneau | ......... | G06F 9/5072 |
| | | | | 709/203 |
| 8,706,915 B2* | 4/2014 | Duchesneau | ......... | G06F 9/5072 |
| | | | | 709/203 |
| 8,885,502 B2* | 11/2014 | Huang | ............... | H04L 43/0864 |
| | | | | 370/252 |
| 9,143,392 B2* | 9/2015 | Duchesneau | ......... | G06F 9/5072 |
| 9,320,050 B2* | 4/2016 | Singh | .................. | H04W 72/02 |
| 2013/0064105 A1 | 3/2013 | Huang et al. | | |

* cited by examiner

Transmission process of RTCP feedback

Determination of network path characteristics

RTT Inferring process (step 607)

RTCP packet synchronisation

FEEDBACK MANAGEMENT IN A MULTIPATH COMMUNICATION NETWORK

This application claims the benefit under 35 U.S.C. § 119(a)-(d) of United Kingdom Patent Application No. 1419904.6, filed on Nov. 7, 2014 and entitled "Feedback Management in a Multipath Communication Network". The above cited patent application is incorporated herein by reference in its entirety.

FIELD OF THE INVENTION

The present invention relates to the management of feedback messages in multipath communication networks.

The invention has applications in the management of RTCP (Real Time Control Protocol) message transmission in multipath RTP session contexts.

BACKGROUND OF THE INVENTION

Communication networks now make it possible to use multiple network interfaces for sending data over several transmission paths. For example, media data may be streamed over several paths whereas before, RTP (Real Time Protocol) video streaming sessions relied on UDP (User Datagram Protocol) for sending the media stream using only one single network interface.

In the IETF (Internet Engineering Task Force) draft (referenced as "draft-singh-avtcore-mprtp-09") the multipath transmission of an RTP (Real Time Protocol) stream consists in transmitting the RTP packets, from a sender to a receiver, over different network paths. A path is defined as a connection between one network interface of the server (the sender) and one network interface of the client (the receiver). The maximum number of paths is equal to the total number of associations between all the network interfaces of the sender and the receiver.

In order to control and monitor the transmission of the RTP packets during a communication (or media) session, RTCP (Real Time Control Protocol) packets are exchanged between the sender and the receiver. RTCP packets comprise RTCP feedback messages. RTCP feedback messages are sent regularly and comprise for instance "Receive Reports" and "Sender Reports" that make it possible to estimate the transmission conditions over the transmission paths. In case of streaming over multiple paths, the network conditions observed on each path may be different. The IETF draft thus requires RTCP feedback messages per "subflow" (i.e. per path) in addition to aggregate feedback messages that provide feedback information about the whole media session (standardized in the RTP Standard, document IETF RFC 3550).

The sender uses the information from the feedback messages in order to make distribution decisions at the expiry of a scheduling interval.

Document US 2013/0064105 A1 discloses a feedback protocol in a multiple path network wherein aggregated feedbacks are sent over any one of a plurality of paths depending on performance information (travel time, buffer occupancy) relating to at least two paths.

The inventors have brought into light several drawbacks in the prior art management of feedback in multipath communication networks.

In the IETF draft, there is no specific requirement for transmitting the RTCP messages on a specific path except for the Sender Reports and Receiver Reports (which should be both transmitted over the same path in order to ensure that the round trip time RTT is computable).

Therefore, a very straightforward solution such as randomly selecting the path over which feedback messages may be sent may lead to an inefficient session control since some feedback messages may be either lost (depending on the packet loss rate of the path) or received lately due to path transmission latency, or even discarded if the available bandwidth on the path is too low.

In document US 2013/0064105 A1, the path selection is based only on the performance of each path and not on the RTCP packet type constraints and the network path status.

Therefore, RTCP packets may be sent on inappropriate communication paths.

Thus, the inventors brought into light the fact that there is still a need for better feedback management in multipath communication networks. In particular, they brought into light a need for optimal transmission of RTCP like messages in multipath contexts.

The present invention lies within this context.

SUMMARY OF THE INVENTION

According to a first aspect of the invention there is provided a method of managing feedback messages in a multipath communication network, the method comprising selecting at least one communication path out of a set of communication paths between a first communication device and a second communication device in order to transmit at least one feedback message from the first communication device to the second communication device and wherein said selecting is based on a correlation between at least one transmission condition on said at least one communication path and at least one transmission constraint for said at least one feedback message.

Embodiments make it possible to provide optimal transmission of feedback messages in a multipath context.

Embodiments provide better quality of service, in particular in media distribution networks.

According to embodiments, the selection of the communication paths over which the feedback messages are sent is based on the network conditions of each path and also the characteristics of the feedback messages. In other words, the selection of the appropriate path for transmitting each feedback message is based on a correlation of the transmission constraints (determined from the type of feedback message or the size of the feedback message for example) and the network conditions on the communication paths.

For example, in case of network conditions downgrading for one path, the sending of the feedback messages for this path is switched to the other paths. This provides for a real time adaptation of the feedback messages transmission. The adaptation to the network condition changes is performed rapidly and efficiently.

According to embodiments, a greater number of feedback messages may be sent with success and received, thereby guaranteeing the fact that the responses (if any) can be provided in time.

According to embodiments, the sending of the feedback messages over each path may be scheduled in order to increase the estimation accuracy of the network transmission characteristics.

The method may further comprise selecting a plurality of communication paths of said set of communication paths in order to transmit, in synchronization, a plurality of feedback messages from said first communication device to said second communication device over said plurality of communication paths respectively.

For example, said at least one transmission constraint depends on at least one of:
- a characteristic of said at least one feedback message to transmit,
- a characteristic representing a function of respective characteristics of a plurality of feedback messages embedded within a same data packet, said at least one feedback message to transmit being embedded within said same data packet.

For example, said characteristic relates to a type of feedback message.

For example, said characteristic relates to a size of feedback message.

For example, said characteristic relates to a timing constraint for transmitting a feedback message.

For example, said characteristic relates to a priority level of a feedback message.

For example, said at least one transmission condition relates to a bandwidth of said communication path for transmitting said at least one feedback message.

For example, said at least one transmission condition relates to a quality of transmission on said communication path.

For example, said at least one transmission condition relates to a time of transmission for transmitting said at least one feedback message over said communication path.

For example, said at least one transmission condition relates to a round-trip time over said communication path.

For example, said at least one transmission condition relates to a loss rate over said communication path.

For example, said at least one feedback message is a network transmission monitoring message.

For example, said at least one feedback message is an error transmission correction message.

For example, said at least one feedback message is a codec control message.

For example, said correlation is represented at least by a score, the value of said score depending on said at least one feedback message and said at least one communication path.

For example, said at least one communication path is selected when the value of said score is above a threshold.

For example, said score is based at least one of the following components:
- a bandwidth component representing the correlation between the bandwidth of said at least one communication path and timing constraints of said at least one feedback message,
- a reliability component representing the correlation between a priority level of said at least one feedback message and a reliability of said at least one communication path for transmitting said at least one feedback message, and
- an affinity component representing a level of association between said a content of said at least one feedback message and said at least one communication path.

For example, said score is a function of said components.

For example, said score is a weighted sum of said components.

For example, said correlation is determined at least according to a decision tree comprising a set of conditions to be tested for characterizing said correlation.

For example, said at least one communication path is selected when at least one condition of said set of conditions is fulfilled.

For example, at least one condition of said set of conditions relates to:
- a bandwidth condition characterizing the correlation between the bandwidth of said at least one communication path and timing constraints of said at least one feedback message,
- a reliability condition characterizing the correlation between a priority level of said at least one feedback message and a reliability of said at least one communication path for transmitting said at least one feedback message, and
- an affinity condition characterizing a level of association between said a content of said at least one feedback message and said at least one communication path.

For example, the conditions of said set of conditions are ordered, said conditions being to be checked according to said order, and wherein if one condition is fulfilled, the following conditions are not tested.

For example, said bandwidth condition is tested before said reliability and/or affinity conditions.

For example, said affinity condition is tested after said bandwidth and/or reliability conditions For example, said at least one transmission constraint is compared to respective transmission conditions on a plurality of communication path and the at least one communication path selected is a communication path having a best correlating communication conditions with said at least one transmission constraint.

For example, said plurality of feedback massages comprise:
- a global feedback message dedicated to a multipath communication session in which said set of communication paths are established, and
- specific feedback messages respectively dedicated to a communication path of said plurality.

According to a second aspect of the invention there is provided a method of managing feedback messages in a multipath communication network, the method comprising selecting a plurality of communication paths out of a set of communication paths between a first communication device and a second communication device in order to transmit a plurality of feedback messages from the first communication device to the second communication device over respective communication paths, and wherein said plurality of messages are sent in synchronization over said respective communication paths.

For example, said plurality of feedback massages comprise:
- a global feedback message dedicated to a multipath communication session in which said set of communication paths are established, and
- specific feedback messages respectively dedicated to a communication path of said plurality.

The method according to the first aspect of the invention may be combined with the method of the second aspect of the invention.

According to a third aspect of the invention there is provided a device comprising a processing unit configured to implement a method according to the first and/or second aspect of the invention.

For example, the device according to the third aspect is embedded in at least one of the first and second devices between which the feedback messages are transmitted.

According to a fourth aspect of the invention there are provided computer programs and computer program products comprising instructions for implementing methods according to the first, and/or second aspect(s) of the invention, when loaded and executed on computer means of a programmable apparatus.

The objects according to the second, third and fourth aspects of the invention provide at least the same advantages as those provided by the method according to the first aspect.

BRIEF DESCRIPTION OF THE DRAWINGS

Features and advantages of the invention will become apparent from the following description of non-limiting exemplary embodiments, with reference to the appended drawings, in which.

DETAILED DESCRIPTION OF THE INVENTION

Figure 1:
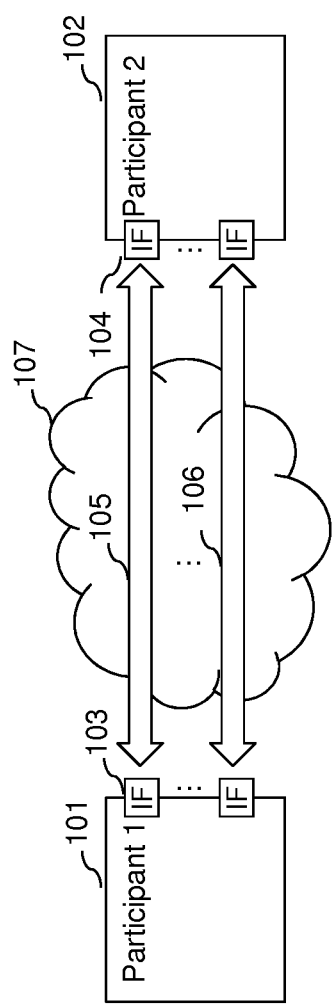
FIG. 1 schematically illustrates a system performing data communication in a multipath context.

A general context of implementation of embodiments is illustrated in FIG. 1.

Two devices 101 (Participant 1) and 102 (Participant 2) exchange data, for example multimedia content, through a network 107. Each device is set up with at least two respective network interfaces 103 (IF) and 104 (IF) in order to perform multipath communications.

Each transmission path between two interfaces (IF) is referred to as a "subflow" in what follows (the same wording is used in the draft Multipath RTP protocol standard). In FIG. 1, only two subflows 105 and 106 are represented. However, a greater number of subflows may be used.

A communication session, such as an RTP session, is established between the two devices 101, 102. The communication session may be bidirectional, i.e., data (for example media data) may be transmitted from device 101 to device 102 and conversely. However, in what follows, only for illustrative purposes, the communication session is considered to be a unidirectional streaming of media data from device 101 to device 102.

In order to control the network transmission from device 101, the "server", to device 102, the "client", several feedback messages may be exchanged.

In what follows, for illustrative purposes, the communication session is considered to be an RTP session. The feedback messages are thus embedded into RTCP packets exchanged using the RTCP communication protocol. There are several types of RTCP feedback messages:

feedback messages for monitoring the network transmission such as "Sender Reports" (SR), "Receiver Reports" (RR) which may be used for estimating the network jitter, loss rate and/or also the round trip time (RTT) for instance;

feedback messages for correcting transmission errors such as the Negative acknowledgement (NACK) which makes it possible to request a lost packet retransmission or Slice Loss Indication (SLI) and Picture Loss Indication (PLI) which makes it possible to indicate loss of a specific part of a video sequence;

feedback messages for controlling the codec such as a Full Intra Request (FIR) which asks the encoder to encode a full intra picture in order to limit error propagation in a video sequence or also the Temporary Maximum Media Stream Bit Rate Request (TMMBR) that indicates a bit rate limit to be respected by the encoder.

The list above is not limitative and the invention is not limited to the RTCP communication protocol.

The RTCP feedback messages are generated by the application which manages the RTP media session as a function of the events observed during the transmission.

Figure 2:
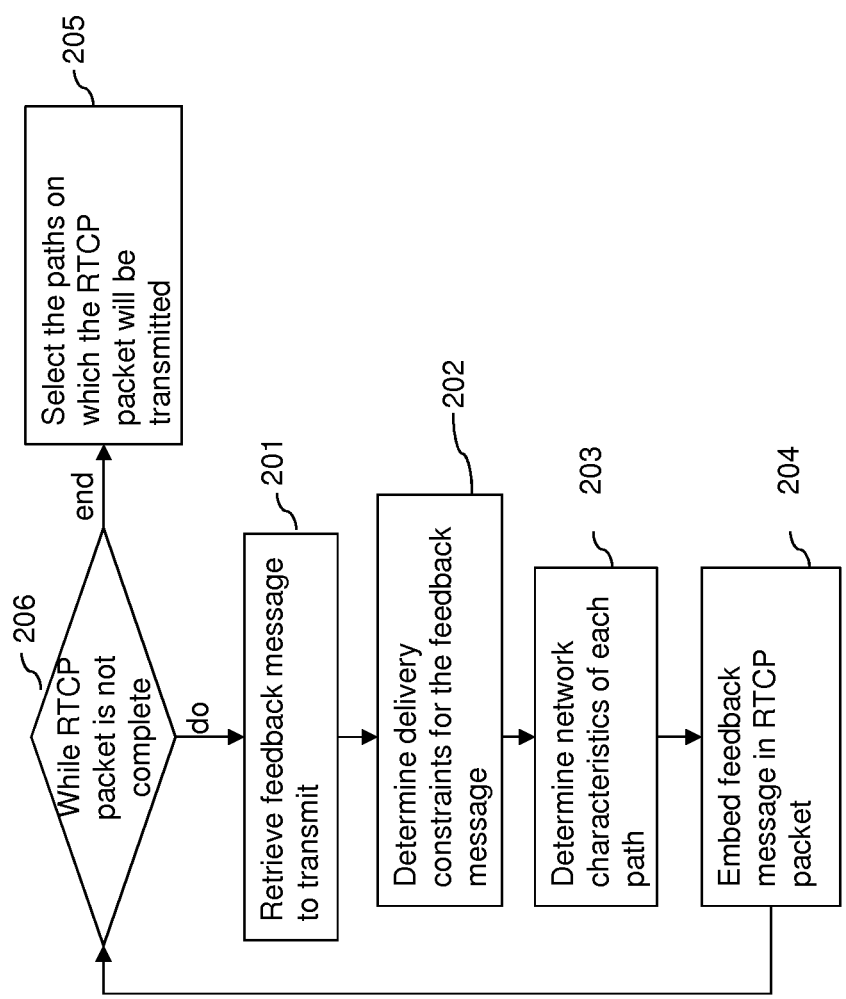
FIG. 2 is a flowchart of steps illustrating the transmission of feedback messages according to embodiments.

FIG. 2 illustrates the transmission process of one RTCP packet that embeds at least one RTCP feedback message generated by the application and that should be transmitted to a client device. The process comprises a processing loop of four steps (steps 201 to 204) which are applied successively to each RTCP feedback messages generated by the application until one RTCP packet is fully constituted.

First, an RTCP feedback message is obtained (step 201) from the memory used by the application. Next (continue), the RTCP feedback message obtained is analysed in order to determine (in step 202) its delivery constraints. For example, these constraints comprise an available bandwidth limit, a maximum transmission latency (in particular for NACK RTCP messages), a priority index (which gives an indication of the importance level of the message) or a combination thereof. The list of possible constraints is not limitative. The determination of the delivery constraints is further described in what follows with reference to FIG. 3.

Next, the characteristics of each path (or subflow) such as the bandwidth, the loss rate, RTT (round time trip) or a combination thereof (the list is not limitative) are estimated or measured during step 203.

Then each RTCP feedback message is encapsulated in a network packet in order to form an RTCP packet during step 204. In the exemplary context of document IETF RFC 3550, RTCP feedback messages should be embedded in network packet with some constraints for a single path transmission: each RTCP packet must include at least a Receiver Report or a Sender Report feedback message. Still in this exemplary context, it must also include a SDES (Session Description) feedback message. In addition to these required feedback messages, document IETF RFC 3550 provides that the RTCP packet may include other feedback messages (for instance, SLI, PLI, NACK etc.). This kind of RTCP packets is referred to as a "Compound Packet". The IETF has also allowed the use of empty Receiver or Sender Report feedback messages in compound packets.

In the MPRTP IETF draft, it is recommended to encapsulate some feedback messages in Reduced Size RTCP packets. There is no restriction on the content of the RTCP packet and thus, any type and any number of feedback messages may be conveyed in the RTCP packet. As a consequence, it is allowed to use Compound Packets for carrying information specific to subflows in a multipath transmission context but not recommended since it increases the bandwidth consumption.

Once the RTCP packet is fully constituted (end, step 206), the delivery constraints of each RTCP message conveyed in the RTCP packet are used in order to select (step 205) the paths on which the packet will be transmitted.

As described hereinafter with reference to FIG. 5, at least one path is selected whose characteristics are in line with the RTCP packet delivery constraints. The Quality of Service (QoS) of the network transmission is thus improved thanks to a better probability of correct delivery of the feedback messages. The media stream sender is also enabled to react more rapidly to network characteristic evolutions or to any event occurring during the transmission.

Figure 3:
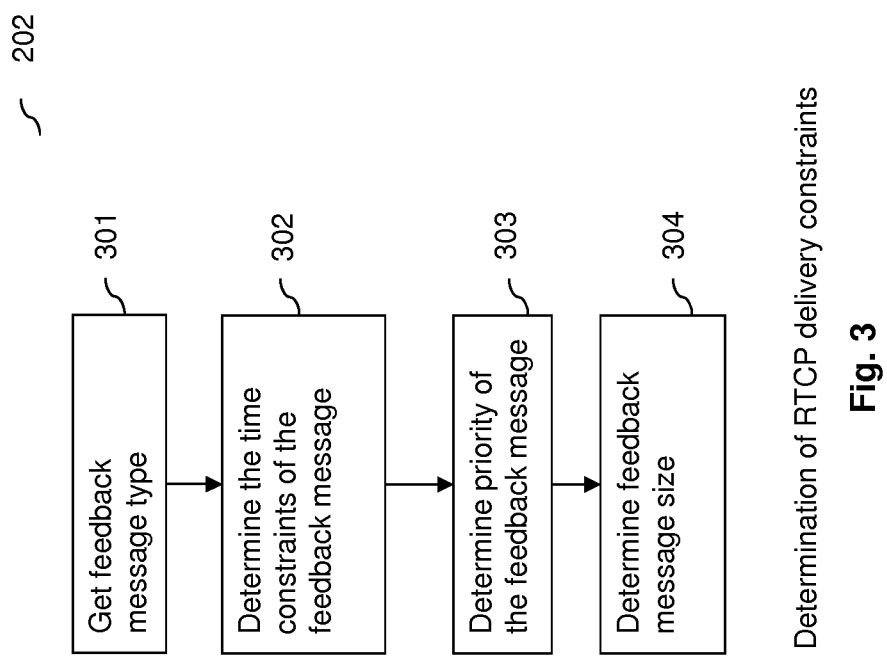
FIG. 3 is a flowchart of steps illustrating the determination of feedback messages delivery constraints according to embodiments.

FIG. 3 illustrates the process of step 202 for determining the delivery constraints of the RTCP feedback message.

First (step 301), the type of RTCP feedback message generated by the application is obtained. The type of the RTCP feedback message corresponds to the type as specified in the "payload type" field of the "RTCP message" field. For instance, NACK, Sender Report and Receiver Report are examples of type values.

Depending on the type of the feedback message, the time constraints of the feedback message are determined (step 302). For example, it is determined the maximum transmission latency acceptable for a given type of RTCP feedback message depending on application latency requisites. RTCP feedback messages are characterized in three different categories as a function of their type. The three categories are the following:

1. RTCP feedback messages which are transmitted regularly with a fix interval of time between two RTCP feedback message exchanges. A typical example is the Sender Report and the Receiver Report which are recommended in document RFC 3550 to be exchanged regularly with a maximum time interval of 5 seconds.

2. RTCP feedback messages which are outdated if not processed before a deadline. For instance, NACK feedback messages which aim at requesting a re-transmission of lost packet have to be processed before a specific date in order to ensure that the re-transmitted RTP packets will be received by the requester before being considered as outdated.

3. Other feedback messages which have no constraints of latency such as the BYE message which is used to close the RTP session.

For the first category of RTCP feedback messages, the maximum latency is set equal to the remaining time before next scheduled RTCP feedback message transmission. For the second category of RTCP feedback messages, the maximum latency is computed as the difference between the remaining time before the deadline and the processing and transmission time of the RTCP feedback message. For the third category of feedback messages, the maximum latency is set to an infinite value.

After the time constraints have been determined, the importance of the RTCP feedback message is estimated (step 303). A priority level which represents the importance of the RTCP feedback message is attributed to the feedback message as a function of the type of the feedback message.

For example, the priority level is an integer value between 0 and 100. When the priority level is "0", the RTCP feedback message has the lowest priority because it will not have much impact on the streaming session if not delivered to the client. When the priority level is "100", the RTCP feedback message has the highest priority because it will have a significant impact on the streaming session if not delivered to the client. All the other values make it possible to rank the messages according to their impact on the quality of service when not properly transmitted.

In particular, NACK feedback messages should have a high priority level since they make it possible to correct missing packets. According to embodiments, three different values may be attributed to the NACK feedback messages as a function of the type of lost information. For instance, if the lost RTP packet is used as a reference picture for motion compression, its value is set to predetermined level, for instance 70. In addition, if the lost packet is for a non-reference picture it has low impact on the perceived quality, the priority level is set to 30 for example.

For Receiver Report feedback messages, a low priority level is set when the network characteristics are stable. On the contrary, if the situation is varying rapidly, the priority level is increased in order to maximize the probability of proper delivery of the Receiver Report feedback message to the server (the sender) which is then able to update its estimated bandwidth value in order to adapt rapidly to the new transmission conditions. Similar approach may be applied for other RTCP feedback messages types.

After the priority level has been determined, the size of the RTCP feedback message is determined (step 304). The total size of the RTCP packet generated at the end of the processing loop in step 206 (FIG. 2) is equal to the sum of all RTCP feedback messages sizes plus additional syntax elements used for RTCP encapsulation (for instance, additional headers for carrying subflow identifiers or encryption prefix). This size will be used in step 205 (FIG. 2) in order to compute the bandwidth required to transmit the RTCP packet.

Figure 4:
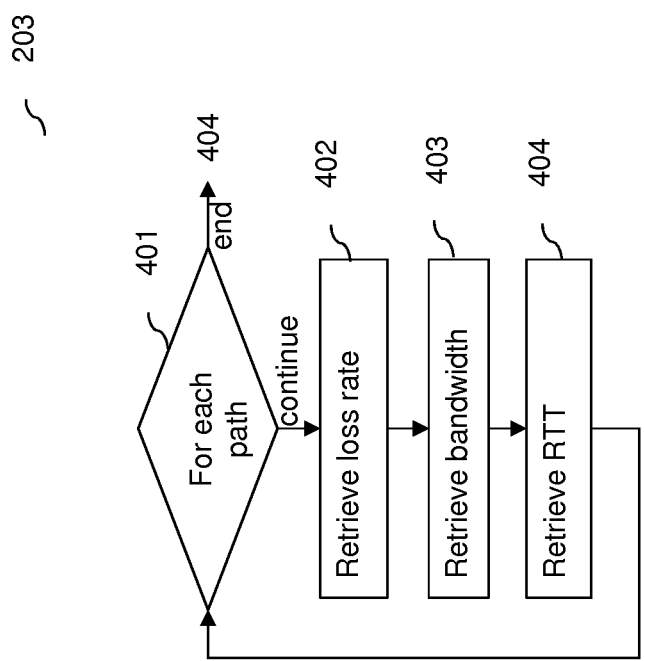
FIG. 4 is a flowchart of steps illustrating the determination of network path characteristics according to embodiments.

FIG. 4 illustrates the process of step 203 for determining the network path characteristics.

The process comprises a processing loop (steps 402 to 404) for each path employed in the network. At each iteration, it is tested (step 401) whether all paths have been processed. In such case (end), the process continues with the encapsulation of the RTCP feedback message in a network packet (step 204, FIG. 2). Otherwise (continue), the loss rate of the path is estimated (step 402).

The loss rate may be estimated by computing the ratio between the number of correctly received packets and the number of packets expected to be received. For example, this parameter may be computed in a manner similar to the computation of the Receiver Report.

Next, the bandwidth consumed by the RTP session is measured (step 403) in order to estimate the maximum bandwidth that is dedicated to the RTCP stream. For instance, it may be set according to the recommendation in document RFC 3550 (i.e. 5% of the RTP session bandwidth).

The RTT (round trip time) parameter is then computed (step 404).

In a unidirectional media transmission, the RTT may be estimated at the sender side from the Receiver Report RTCP message sent by the client. As a consequence, the client needs to retrieve the RTT value. According to embodiments, the RTT computed by the server (the sender) is sent to the client using a proprietary RTCP feedback message which conveys the value of the RTT parameter. To do so, a new payload type value is attributed to the proprietary RTCP message. For example, the payload data is a 64 bits value indicating the RTT in microseconds ($\mu s$).

In a bidirectional media transmission, the sender transmits media data to the client and conversely. Thus, RTCP feedback messages are exchanged in both directions and the RTT is computed at each side. The RTT may thus be determined by collecting the last RTT computed by its own RTCP processing module directly in its memory.

Figure 5:
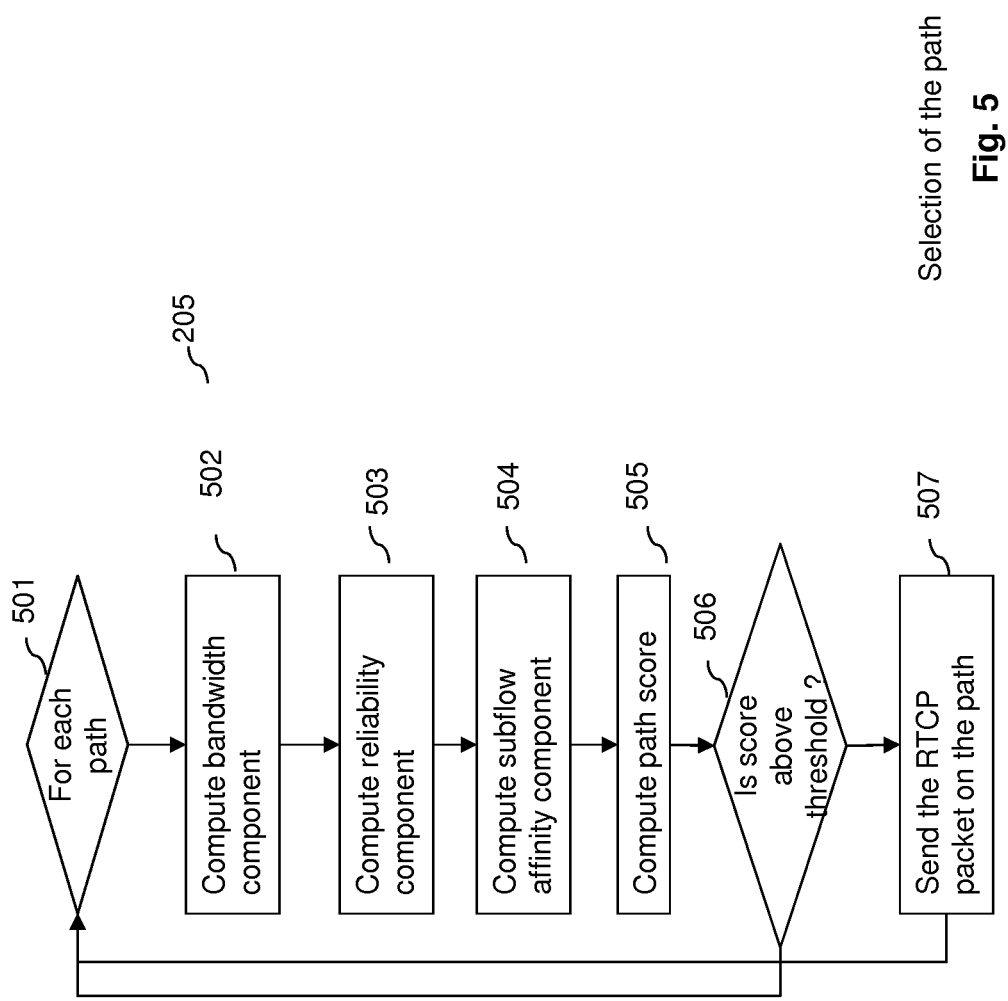
FIG. 5 is a flowchart of steps illustrating the reception of feedback messages according to embodiments.

FIG. 5 illustrates the process of step 205 for selecting a transmission path.

The RTCP packet transmission constraints (determined in step 202) imposed by the RTCP feedback messages conveyed within are compared with the characteristics parameters (as determined in step 203) of each path (processing loop controlled by step 501) in order to determine a correlation between the path characteristics and the packet transmission constraints.

According to embodiments, the correlation may be evaluated by computing a score (steps 502 to 505) for each path which depends on the RTCP packet to be transmitted and which reflects the interest of transmitting the RTCP packet on the path.

When the score value is above a predetermined threshold (step 506), the characteristics of the path are considered sufficient for transmitting the RTCP packet and the RTCP packet is transmitted in step 507. Consequently, one RTCP packet may be transmitted over several paths if the computed score is sufficiently high for at least two paths. This may happen when an RTCP packet conveys very important feedback messages that should be reliably (at least with the highest possible reliability) transmitted to the client.

The score computation for each path is described in what follows. For example, the score may be based on three different components, in particular:

1. A first component which aims at representing the balance between the RTCP packet constraints in terms of bandwidth and the bandwidth of the path. This may include comparing the timing constraints of the RTCP feedback messages with the latency of the path.

2. A second component which compares the priorities of the RTCP feedback messages with the transmission reliability of the path.

3. A third component that is computed as a function of the affinity of the RTCP packet with each path. This component makes it possible to give priority to the selection of the path which is concerned by RTCP feedback messages embedded in the RTCP packet.

The score may be a function of the components. For example, the score of the path is a weighted sum of the three components.

The bandwidth score is computed as follows.

The bandwidth of the path imposes constraints on the transmission of the RTCP packets. The transmission time of an RTCP packet depends on the size of the RTCP packet and the bandwidth of the path. The transmission time increases when the size of the RTCP packets increases. Besides, it decreases when the bandwidth of the path increases.

For example, some RTCP feedback messages (for instance NACK feedback messages) have timing constraints (determined during step 302, FIG. 3) and should be requested only if they can be processed in time by the recipient. The processing time of one RTCP message may be expressed as the sum of the transmission time on the network plus the time required for sending the packet (which depends on the bandwidth) and finally an interval of time required for processing the RTCP packet and responding to the RTCP packet. The value of the sum obtained should be lower than the timing constraints of each of the RTCP feedback messages embedded in the RTCP packet. The RTCP packet timing constraint is thus defined as the minimum value among all the RTCP feedback messages constraints of the RTCP packet.

For calculating the bandwidth component, it is determined (step 502), the bandwidth required $B_{req}$ for ensuring that the processing time of the RTCP packet is in line with its timing constraints.

The sending time is computed as follows:
$T_{send} = T_{latency} - RTT_i - T_{proc}$, where $T_{send}$ is the sending time, $T_{latency}$ is the processing latency of the RTCP packet (determined from values computed in step 302), $RTT_i$ is the RTT of the $i^{th}$ path and $T_{proc}$ is the estimated processing time of the RTCP packet at the client side.

The required bandwidth $B_{req}$ is computed with the following formula:
$B_{req} = S_{packet}/T_{send}$ where $S_{packet}$ is the size of the RTCP packet i.e. the sum of each RTCP feedback messages size determined in step 304 (FIG. 3) plus additional syntax elements used for RTCP encapsulation (for instance, additional headers for carrying subflow identifiers or encryption prefix). The bandwidth score B is computed as the difference between the maximum available bandwidth (determined in step 403, FIG. 4) and the bandwidth $B_{req}$ required to transmit the RTCP packet in time.

The reliability score is computed in step 503. It aims at representing the reliability of the path for an RTCP packet of a given priority level. According to embodiments, the priority of the RTCP packet is computed as the highest priority value of the RTCP feedback messages of the packet. According to other embodiments, the mean of RTCP feedback messages priority levels is used in order to avoid overestimating the importance of a packet composed mostly of low importance feedback messages but with one message with a high priority in comparison to a packet composed of only high priority feedback messages. The reliability score is computed as the difference between the priority of the RTCP packet and the loss rate in percent).

The affinity score of the RTCP packet is computed in step 505 for each subflow of the network transmission. The value of the score is determined as a function of each the RTCP feedback messages types determined in step 301 (FIG. 3) for each feedback messages of the RTCP packet.

A high affinity level (for example equal to "100") for one path indicates that the packets should be transmitted over this path. This may be the case for packets that include feedback messages which are providing information on one specific path. For instance, Receiver Reports should be transmitted over the path to be monitored in order to avoid miscalculation of the RTT values at the client's side. In such case, the affinity score of the RTCP packet is set to "100" when the path corresponds to the monitored subflow.

On the contrary, the affinity score of other paths is set to "0" in order to avoid sending the RTCP packet on another subflow.

Figure 6:
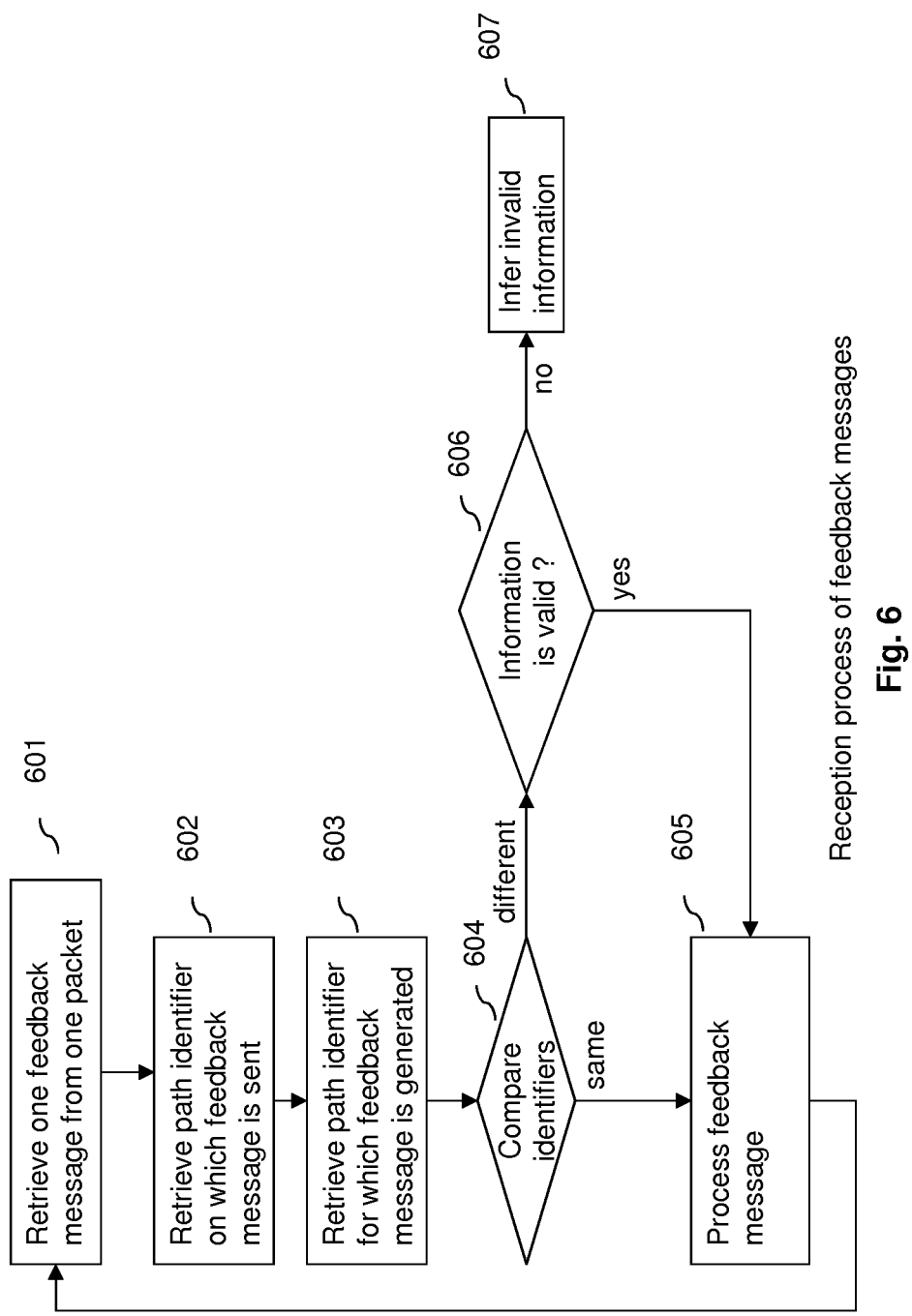
FIG. 6 is a flowchart of steps illustrating the selection of a path as a function of feedback messages constraints and network path characteristics according to embodiments.

The processing of a packet sent on a path different from the one monitored is detailed in what follows with reference to the FIG. 6. When the packet is not associated with a specific path, the affinity level has an intermediate value (for instance "50") in order not to give priority to one path more than another one.

The score of the path is computed (step 505) as a weighted sum of the bandwidth, reliability and affinity components according to the following formula:
$S_i = x_0 \cdot B_i + x_1 \cdot R_i + x_2 \cdot A_i$ where i corresponds to the $i^{th}$ path, $S_i$ is the score of the $i^{th}$ path, $B_i$ the bandwidth score component (defined in step 602 in what follows with reference to FIG. 6), $R_i$ the reliability score component (defined in step 603 in what follows with reference to FIG. 6) and $A_i$ the affinity score computed in step 504. The weighting factors $x_0$, $x_1$ and $x_2$ are predetermined values which are used for reinforcing one of the components of the path score. For instance, using equal values gives equal importance to each of the score components. A weighting factor is set to "0" makes it possible to inhibit the constraints imposed by the RTCP packet related to the concerned score component.

Alternatively, or in combination, the correlation between the RTCP packet constraints and the network path is determined using a decision tree. Using a decision tree may be a non-complex process than can provide rapidity. The principle of the decision tree is to iteratively process each path until one path is selected. For each RTCP packet, it may be preferable to order the paths in the list of paths to be processed in 501 by order of affinity with the RTCP packet. The decision steps are, for instance, the following in testing order:

1. Check if the latency constraints of the feedback messages of the RTCP packet are below the transmission time of the packet computed from the path's RTT and bandwidth and packet's size.
2. Check if the priority of the packet is higher than a predetermined threshold and the loss rate of the path is below another predetermined threshold.
3. Check if the RTCP packet must be sent on the path (affinity evaluation).

When one of the decision steps is valid (on test is positive), the decision process ends and the path is selected. Otherwise (none of the three decision steps (or tests) is positive) the next path is selected and same process is carried out. One advantage of the correlation estimation based on the score value is that RTCP packet may be transmitted over several paths when the feedback information is important to control the RTP session. In addition, the path selection is a more accurate since the correlation is estimated based on several components (bandwidth, affinity and reliability) jointly computed.

The reception process of the RTCP packets is now described with reference to FIG. 6.

The process is initiated by the reception of an RTCP packet on a specific subflow. A set of RTCP feedback messages is extracted from the RTCP packet received (step 601). Each RTCP feedback message is successively processed in steps 601 to 607. The path identifier, i.e. the subflow identifier, stored in the header of the RTCP feedback message or in associated additional headers is extracted from the RTCP packet (step 602) and stored in memory for later use. Next, the path identifier on which the RTCP feedback message has been transmitted is retrieved from the network stack in step 603. The path identifier on which the RTCP packet has been transmitted is the same for all RTCP feedback messages conveyed in the same RTCP packet.

In the following steps, a classical processing of the RTCP feedback is performed when the feedback message transmitted over a path that is concerned by the content of the RTCP feedback messages. This is because otherwise, some data may be not correctly processed and this may result in an erroneous decoding of the information conveyed in the RTCP feedback message.

Consequently, the two identifiers (the identifier of the path on which the packets are transmitted, and the identifier (subflow identifier) associated to the RTCP feedback message) are compared in step 604. When they are equal (same), the RTCP feedback message is processed according to a classical processing method, for example as defined in the standard. If the two identifiers are different ("different"), it is checked (step 606) whether the information conveyed in the RTCP feedback message is valid. When valid ("yes"), the classical processing of the RTCP feedback message payload is performed (step 605). If the information is not valid (no), a specific processing is performed (step 607) in order to infer the valid data (for example by extrapolation).

The test of validity of the conveyed information in the RTCP feedback message is performed depending on the type of the RTCP feedback message. Two cases may be envisaged.

First, the RTCP feedback message may not include or refer to information related to the network. For example, RTCP feedback messages used for controlling the codec do not contain such kind of information. The payload data conveyed in these feedback messages is independent from the path on which it has been transmitted.

Second, the RTCP feedback message may include data that refers to network level parameters. This includes RTCP feedback messages used for monitoring the network transmission conditions (e.g. Sender and Receiver Reports) or for performing error resilience (e.g. NACK which indicated RTP sequence number of missing packet). In such cases, the network information may be invalid if the feedback message is not transmitted on the path aimed by the information of the RTCP feedback message. For example, for NACK RTCP feedback messages, the RTP packet cannot be retrieved in the stack of RTP packet to be re-transmitted since they have been sent over a different paths. For this example, the inferring/extrapolating process of step 607 comprises retrieving the RTP packet to be transmitted in the stack of the path identified by the identifier retrieved in step 603.

The responses to the Sender Reports are used for estimating the RTT of the network path. According to embodiments, the RTT information is considered as invalid when it cannot be computed. The RTT is therefore extrapolated in step 607 as being equal to the previous RTT computed for the path with the identifier defined in step 603.

Figure 7:
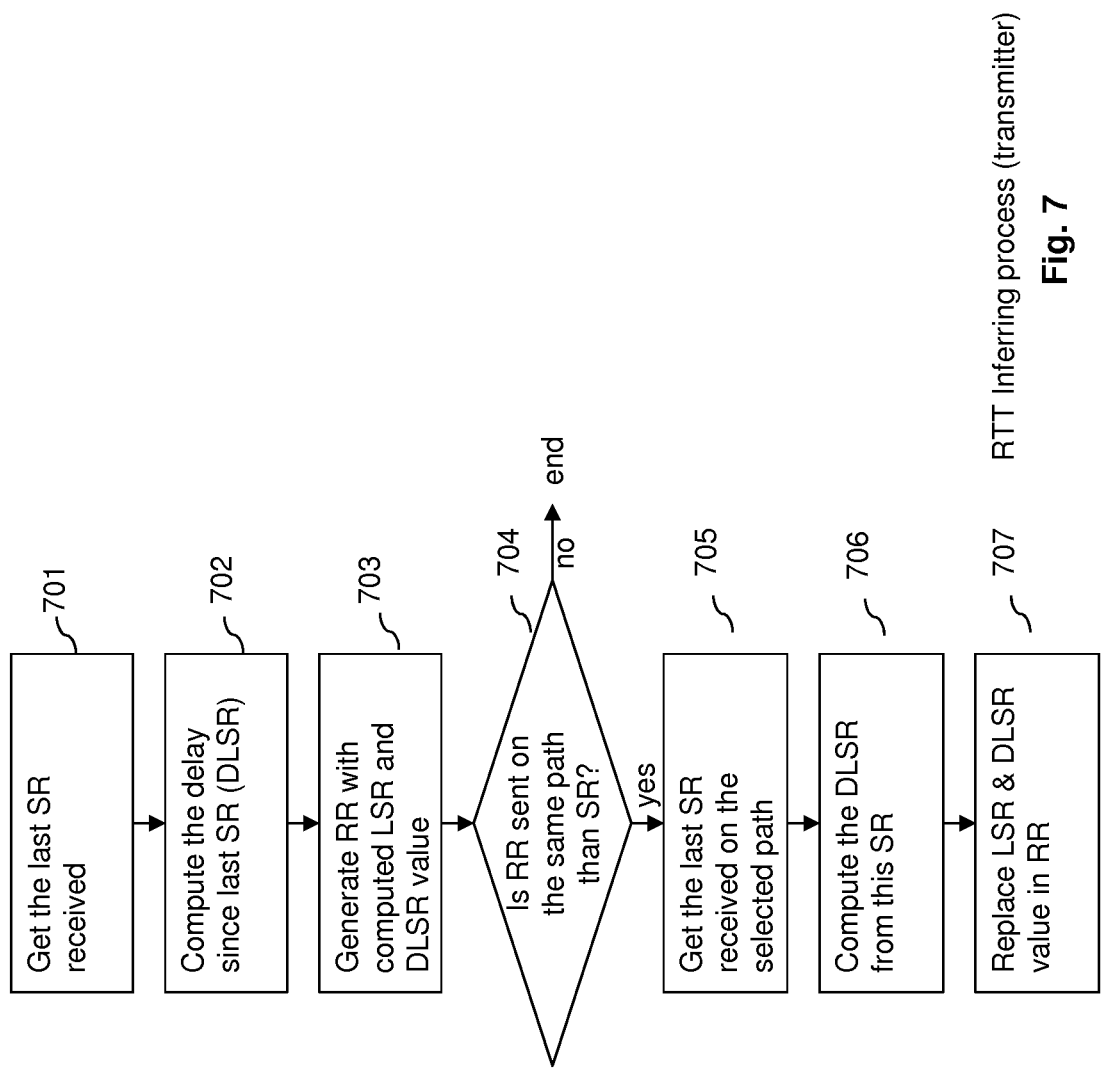
FIG. 7 is a flowchart of steps illustrating the transmission of feedback messages according to embodiments.

According to other embodiments, the RTT is estimated with a better accuracy as described hereinafter with reference to FIG. 7.

The three first steps correspond to the classical process performed for generating a Receiver Report RTCP feedback message. The identifier LSR of the last Sender report received on the path is retrieved step 701 with its received date. From this date, the delay DLSR since last Sender Report is computed in step 702.

These two values LSR and DLSR are set in the corresponding field of the RTCP feedback message payload data in step 703.

In step 704, it is checked whether the generated Receiver Report is not transmitted on the same path as the received Sender Report.

In case it is not (no), the process ends. Otherwise (yes), three additional steps are performed for replacing the value of LSR and DLSR field of the Receiver Report RTCP feedback message. These values are replaced in order to make the more accurate estimation of the RTT possible at the client's side.

This comprises retrieving (step 705) the last Sender Report received on the path selected for transmitting the Receiver Report. This LSR value may thus be different from the LSR value of the original Receiver Report. Next, the DLSR is computed (step 706) for this latest retrieved Sender Report. Then, the values in the original Receiver Report payload data are replaced by these two new computed values (step 707).

Steps 705 to 707 make it possible to compute an estimation of the RTT of the path with an hypothesis commonly made when computing RTT which is that the time of transmission is the same in both transmission directions for each path.

Figure 8:
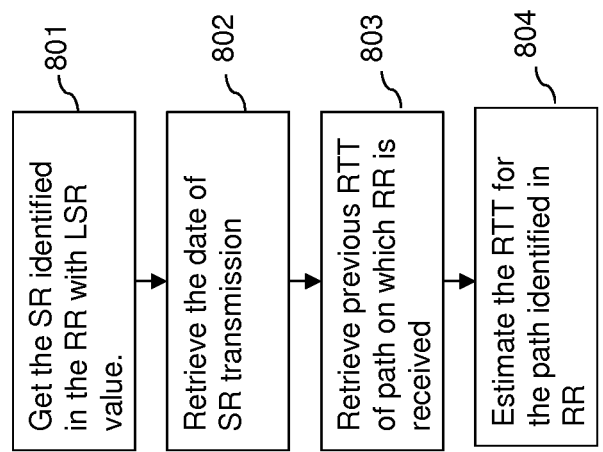
FIG. 8 is a flowchart of steps illustrating a process for retrieving incomplete information from feedback messages according to embodiments.

The inferring process of step 607 for estimating an RTT value is described in what follows with reference to FIG. 8.

During a step 801 a Sender Report is identified and retrieved from the memory based on the LSR value of the Receiver Report. Next, the transmission date the Sender Report is retrieved in step 802. This Sender Report may be only available in the network stack of the path on which the Receiver Report has been sent. In what follows, it is referred to this path as the "second" path and the path being monitored by the Sender Report is referred to as the "first" path.

The RTT is then estimated classically from the date of Sender Report transmission and the DLSR value. The obtained value (noted $RTT_m$) corresponds to the transmission time of the Sender Report on the first path plus the transmission time of the Receiver Report on the second path. In order to compute the RTT of the first path, it is assumed that the RTT of the second path is almost constant.

According to embodiments the latest RTT of the second path is retrieved in step 803. Alternatively, the mean of previous RTTs may also be used. Based on the hypothesis that the RTT is equally divided between the two transmission directions, the estimation of the RTT of the first path is computed in step 804 according to the following formula:

$RTT_1 = 2 \cdot RTT_m - RTT_2$, where $RTT_1$ is the RTT of the first, $RTT_2$ is the RTT of the second path retrieved in step 803, and $RTT_m$ is the means value of the RTT The RTT may thus be estimated even though the RTT varies rapidly and significantly.

In order to benefit from the diversity of paths for transmitting control feedback messages, the sending of the RTCP packets may be scheduled over the different paths.

The RTCP packets provided on a predetermined number of paths are synchronized in order to enable the client to infer information from a predetermined number of synchronized RTCP packets that relate to a path which is not concerned by one of feedback contained in the predetermined synchronized RTCP packets.

This process may be implemented during the sending of the RTCP packet over the network. In particular, this process may be combined with processes as described hereinabove, for example in step 507 (FIG. 5).

The scheduling of RTCP packets is adapted, in particular, when synchronizing the aggregated RTCP packet (i.e. the feedback messages for the whole RTP session) with N−1 MPRTCP packets (i.e. feedback messages dedicated to each subflow) where N is the number of paths. The synchronization of RTCP packets is useful in particular when the RTCP packets used for controlling the subflow streaming has a direct impact on the values (such as packet loss rate) embedded in the RTCP packets sent for the media stream. This may be the case, in particular, for the Receiver Report and the Sender Report. The loss rate on each path has a direct impact on the loss rate estimated for the overall RTP session. The number of packets lost for the media stream is a function of the number of packets lost on each subflow. As a consequence, the sending of N−1 Sender Reports is synchronized in order to make it possible to infer the loss rate of the remaining path from N−1 receiver reports received in response.

One advantage of the synchronization in comparison with the random sending of RTCP packets is that the network monitor is easier to manage since it is possible to a have snapshot of the network conditions simultaneously on every paths of the session.

Figure 9:
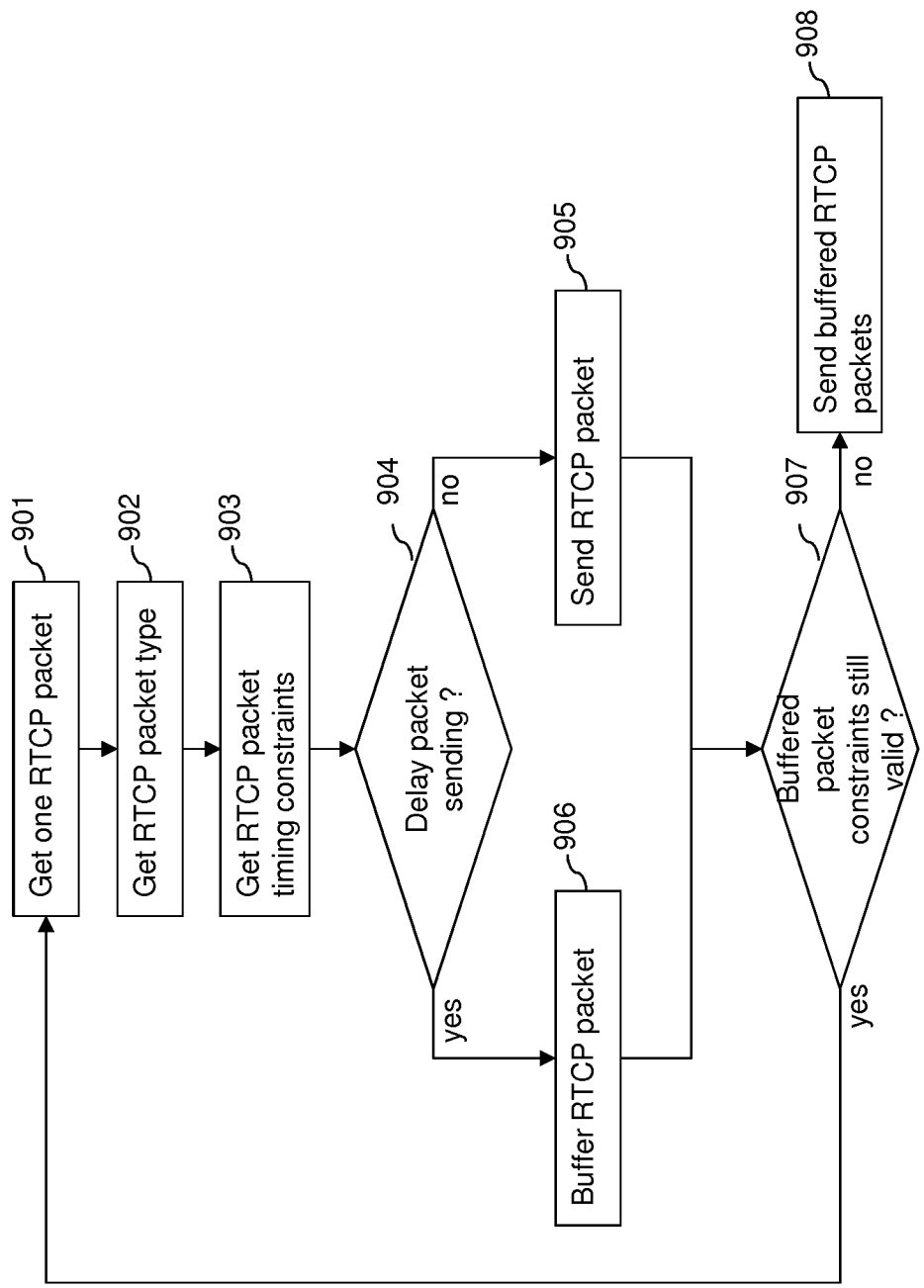
FIG. 9 is a flowchart of steps illustrating the synchronization of feedback messages packets comprising control messages according to embodiments, FIG. 10 schematically illustrates a device according to embodiments.

FIG. 9 illustrates a process for synchronizing RTCP packets. The process may be carried out in step 507 (FIG. 5) for example.

A set of RTCP packets to be sent synchronously is buffered while taking into account each packet's timing constraints.

An RTCP packet to be transmitted is retrieved in step 901. Next, it is determined in step 902 if the packet contains some RTCP feedback messages that shall be transmitted synchronously. For instance, it is the case when the packet includes a Receiver Report. The timing constraints, e.g. the date when the packet must be sent in order to ensure that it will be processed in time, is stored in a memory and associated with the RTCP packet in step 903. Depending on the feedback message type, it is tested in step 904 whether the packet may be delayed for a simultaneous transmission later with other RTCP packets.

The decision is made based on the type retrieved in step 902. If the decision is negative (no), the RTCP packet is sent (step 905). Otherwise, (yes) the packet is stored in an RTCP packet buffer in step 906. RTCP packets are buffered by type of packet to be synchronously transmitted. For example, the buffered RTCP packets which include Receiver Report are stored in a buffer different from the packets which contain NACK RTCP feedback messages. The transmission of the buffered packet is controlled in step 907 during which it is checked whether buffered packet constraints impose to transmit the packets at this moment (step 908). The constraints that may trigger the transmission may be as follows: either the number of buffered packets reaches N−1 value, where N is the number of paths, or the timing constraints of at least one packet reaches the due date of the packet (determined in step 903).

Figure 10:
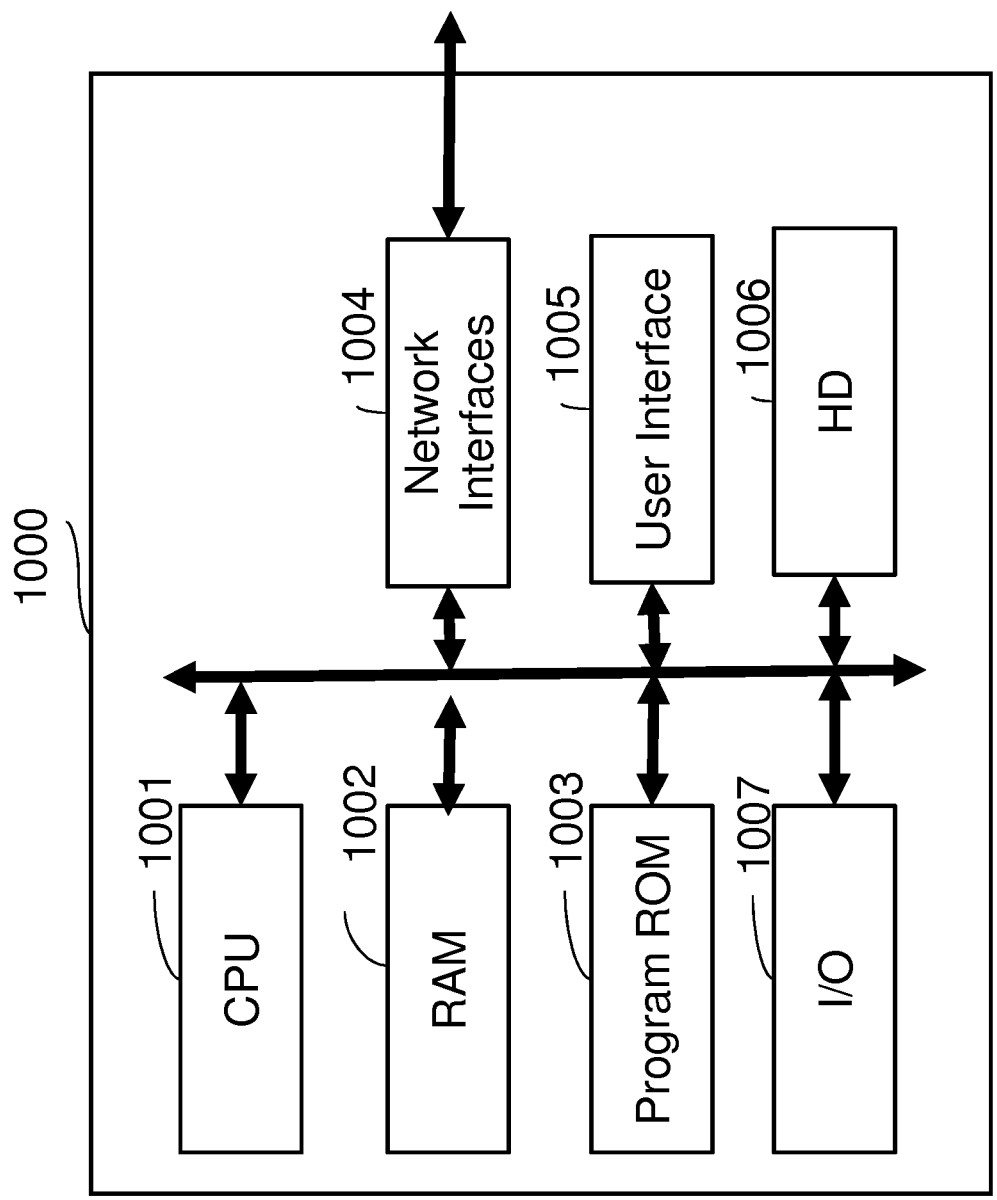

FIG. 10 is a schematic block diagram of a device 1000 for implementing of one or more embodiments of the invention. The device 1000 comprises a communication bus connected to:

A central processing unit 1001, such as a microprocessor, denoted CPU;

A random access memory 1002, denoted RAM, for storing the executable code of the method of embodiments of the invention as well as the registers adapted to record variables and parameters necessary for implementing a method according to embodiments, the memory capacity thereof can be expanded by an optional RAM connected to an expansion port for example;

A read only memory 1003, denoted ROM, for storing computer programs for implementing embodiments of the invention;

A network interface 1004 is typically connected to a communication network over which digital data to be processed are transmitted or received. The network interface 1004 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1001;

A user interface 1005 for receiving inputs from a user or to display information to a user;

A hard disk 1006 denoted HD

An I/O module 1007 for receiving/sending data from/to external devices such as a video source or display The executable code may be stored either in read only memory 1003, on the hard disk 1006 or on a removable digital medium such as for example a disk. According to a variant, the executable code of the programs can be received by means of a communication network, via the network interface 1004, in order to be stored in one of the storage means of the communication device 1000, such as the hard disk 1006, before being executed.

The central processing unit 1001 is adapted to control and direct the execution of the instructions or portions of software code of the program or programs according to embodiments of the invention, which instructions are stored in one of the aforementioned storage means. After powering on, the CPU 1001 is capable of executing instructions from main RAM memory 1002 relating to a software application after those instructions have been loaded from the program ROM 1003 or the hard-disc (HD) 1006 for example. Such a software application, when executed by the CPU 1001, causes the steps of a method according to embodiments to be performed.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of managing feedback messages in a multi-path communication network utilised to transmit, between a first communication device and a second communication device, a data stream in real time by using a set of communication paths comprising plural communication paths associated with the data stream,
   the method comprising:
   determining at least one transmission condition on at least one communication path and at least one transmission constraint for at least one feedback message;
   selecting a plurality of communication paths out of the set of communication paths between the first communication device and the second communication device in order to transmit, in synchronization, a plurality of feedback messages from the first communication device to the second communication device over the plurality of communication paths respectively; and
   wherein said selecting is based on the at least one transmission condition on the at least one communication path and the at least one transmission constraint for the at least one feedback message.

2. The method according to claim 1, wherein the at least one transmission constraint depends on at least one of:
   a characteristic of the at least one feedback message to transmit,
   a characteristic representing a function of respective characteristics of a plurality of feedback messages embedded within a same data packet, the at least one feedback message to transmit being embedded within the same data packet.

3. The method according to claim 2, wherein the characteristic relates to at least one of:
   a type of feedback message,
   a size of feedback message,
   a timing constraint for transmitting a feedback message, and
   a priority level of a feedback message.

4. The method according to claim 1, wherein the at least one transmission condition relates to at least one of:
   a bandwidth of the communication path for transmitting the at least one feedback message,
   a quality of transmission on the communication path,
   a time of transmission for transmitting the at least one feedback message over the communication path,
   a round-trip time over the communication path, and
   a loss rate over the communication path.

5. The method according to claim 1, wherein the at least one feedback message comprises at least one of:
   a network transmission monitoring message,
   an error transmission correction message, and
   a codec control message.

6. The method according to claim 1, comprising calculating a correlation between the at least one transmission condition on the at least one communication path and the at least one transmission constraint for the at least one feedback message, the correlation being represented at least by a score, the at least one communication path being selected when the value of the score is above a threshold.

7. The method according to claim 6, wherein the score is based on at least one of the following components:
   a bandwidth component representing the correlation between the bandwidth of the at least one communication path and timing constraints of the at least one feedback message,
   a reliability component representing the correlation between a priority level of the at least one feedback message and a reliability of the at least one communication path of transmitting the at least one feedback message, and
   an affinity component representing a level of association between a content of the at least one feedback message and the at least one communication path.

8. The method according to claim 6, wherein the correlation is determined at least according to a decision tree comprising a set of conditions to be tested according to an order of the set of conditions for characterising the correlation, the at least one communication path being selected when at least one condition of the set of conditions is fulfilled, the at least one condition of the set of conditions relates to:
   a bandwidth condition characterising the correlation between the bandwidth of the at least one communication path and timing constraints of the at least one feedback message,
   a reliability condition characterising the correlation between a priority level of the at least one feedback message and a reliability of the at least one communication path for transmitting the at least one feedback message, and
   an affinity condition characterising a level of association between a content of the at least one feedback message and the at least one communication path.

9. The method according to claim 1, wherein the plurality of feedback messages comprise:
- a global feedback message dedicated to the communication session in which the set of communication paths are established, and
- specific feedback messages respectively dedicated to a communication path of the set of communication paths.

10. A non-transitory computer-readable storage medium storing a program that causes a computer to function as each step of the method according to claim 1.

11. A device for managing feedback messages in a multipath communication network utilised to transmit, between a first communication device and a second communication device, a data stream in real time by using a set of communication paths comprising plural communication path associated with the data stream,
the device comprising a processing unit configured to:
- determine at least one transmission condition on at least one communication path and at least one transmission constraint for at least one feedback message;
- select a plurality of communication paths out of the set of communication paths between the first communication device and the second communication device in order to transmit, in synchronization, a plurality of feedback messages from the first communication device to the second communication device over the plurality of communication paths respectively; and
- wherein the selecting is based on the at least one transmission condition on the at least one communication path and the at least one transmission constraint for the at least one feedback message.

12. The device according to claim 11, wherein the at least one transmission constraint depends on at least one of:
- a characteristic of the at least one feedback message to transmit,
- a characteristic representing a function of respective characteristics of a plurality of feedback messages embedded within a same data packet, the at least one feedback message to transmit being embedded within the same data packet.

13. The device according to claim 12, wherein the characteristic relates to at least one of:
- a type of feedback message,
- a size of feedback message,
- a timing constraint for transmitting a feedback message, and
- a priority level of a feedback message.

14. The device according to claim 11, wherein the at least one transmission condition relates to at least one of:
- a bandwidth of the communication path for transmitting the at least one feedback message,
- a quality of transmission on the communication path,
- a time of transmission for transmitting the at least one feedback message over the communication path,
- a round-trip time over the communication path, and
- a loss rate over the communication path.

15. The device according to claim 11, wherein the at least one feedback message comprises at least one of:
- a network transmission monitoring message,
- an error transmission correction message, and
- a codec control message.

16. The device according to claim 11, the processing unit being further configured to calculate a correlation between the at least one transmission condition on the at least one communication path and the at least one transmission constraint for the at least one feedback message, the correlation being represented at least by a score, the at least one communication path being selected when the value of the score is above a threshold.

17. The device according to claim 16, wherein the score is based on at least one of the following components:
- a bandwidth component representing the correlation between the bandwidth of the at least one communication path and timing constraints of the at least one feedback message,
- a reliability component representing the correlation between a priority level of the at least one feedback message and a reliability of the at least one communication path of transmitting the at least one feedback message, and
- an affinity component representing a level of association between a content of the at least one feedback message and the at least one communication path.

18. The device according to claim 16, wherein the correlation is determined at least according to a decision tree comprising a set of conditions to be tested according to an order of the set of conditions for characterising the correlation, the at least one communication path being selected when at least one condition of the set of conditions is fulfilled, the at least one condition of the set of conditions relates to:
- a bandwidth condition characterising the correlation between the bandwidth of the at least one communication path and timing constraints of the at least one feedback message,
- a reliability condition characterising the correlation between a priority level of the at least one feedback message and a reliability of the at least one communication path for transmitting the at least one feedback message, and
- an affinity condition characterising a level of association between a content of the at least one feedback message and the at least one communication path.

19. The device according to claim 11, wherein the plurality of feedback messages comprise:
- a global feedback message dedicated to the communication session in which the set of communication paths are established, and
- specific feedback messages respectively dedicated to a communication path of the set of communication paths.

* * * * *